United States Patent [19]
Prafullchandra

[11] Patent Number: 5,734,718
[45] Date of Patent: Mar. 31, 1998

[54] NIS+ PASSWORD UPDATE PROTOCOL

[75] Inventor: Hemlata S. Prafullchandra, Mountain View, Calif.

[73] Assignee: Sun Microsystems, Inc., Palo Alto, Calif.

[21] Appl. No.: 498,464

[22] Filed: Jul. 5, 1995

[51] Int. Cl.$^6$ .............. H04L 9/00; H04L 9/06; H04L 9/30; H04L 9/32
[52] U.S. Cl. .............. 380/4; 380/9; 380/23; 380/25; 380/29; 380/30; 380/49; 380/50
[58] Field of Search .............. 380/4, 9, 23, 25, 380/29, 30, 46, 49, 50; 340/825.31, 825.34

[56] References Cited

U.S. PATENT DOCUMENTS

| | | | |
|---|---|---|---|
| 3,798,605 | 3/1974 | Feistel | 380/25 |
| 5,115,508 | 5/1992 | Hatta | 380/4 X |
| 5,398,285 | 3/1995 | Borgelt et al. | 380/30 |
| 5,418,854 | 5/1995 | Kaufman et al. | 380/23 |

Primary Examiner—Bernarr E. Gregory

[57] ABSTRACT

The present invention provides methods and apparatus for updating passwords in a name service system. A server includes a name service database that further includes a plurality of tables with information, including passwords and communications information, concerning users. To enforce name service system security, users are denied direct access to their passwords and password aging information. These may be updated only through a process running on the NIS+ server. The password process has write access to the password and aging information in the database and is invoked when users change their passwords. To update a password, the user's computer, the client computer, contacts the password update process and sends an encrypted version of the current password. The password update process decrypts the encrypted password and verifies that the user is authentic and the aging criteria are met. The user then enters a new password which is encrypted and provided to the password update process, which enters the new password in the password table.

24 Claims, 11 Drawing Sheets

FIG. 3

| USER NAME | PASSWORD | UID | ... | SHADOW |||||||
|---|---|---|---|---|---|---|---|---|---|---|
| | | | | LAST CHG | MIN | MAX | WARR | INACTIVE | EXPIRE | RESERVED |
| 50 | 52 | 56 | | 60 | 62 | 64 | | | | 58 |
| HEMMA | ZX01245XX | 529 | | 3041 | 10 | 30 | 5 | 3 | | |
| EXAMPLES | | | | | HAVE TO WAIT AT LEAST 10 DAYS AFTER PASSWD UPDATE BEFORE CHANGING AGAIN | EVERY 30 DAYS PASSWD HAS TO BE CHANGE | WILL START WARNING 5 DAYS PRIOR TO PASSWD CHANGE | AFTER 3 DAYS OF INACTIVITY THE ACCOUNT TO LOCKED | LEFT BLANK => NO EXPIRATION | |

FIG. 4

```
struct directroy_obj {
        nis_name do_name;  /* directory object name */
        nstype do_type;    /* directory object type */
        struct{
                u_int do_servers_len;     /* number of servers */
                nis_server *do_servers_val; /* a list of nis_servers */
        } do_servers;
        u_long do_ttl;  /* directory object time to live */
        struct {
                u_int do_armask_len;
                oar_mask *do_armask_val;
        } do_armask;
};
struct nis_server {
        nis_name name;  /* server name */
        struct{
                u_int ep_len;      /* number of endpoints */
                endpoint *ep_val;  /* a list of endpoints */
        } ep;
        u_long key_type;  /* type of key */
        nstype do_type;   /* directory object type */
};
struct endpoint {
        char *yaddr;   /* universal address */
        char *family;  /* family of protocols that his endpoint belongs to */
        char *proto;   /* protocol - udp,tcp... */
```

NIS+ PASSWORD UPDATE PROTOCOL

BACKGROUND OF THE INVENTION

1. Field of the Invention

The present invention relates to password maintenance for a computer network, and more specifically relates to password maintenance for network information services operating on a computer network.

2. Art Background

Computer networks have profilerated rapidly in recent years and their importance to the current information infrastructure of society is difficult to overstate. One major reason for the success of computer networks is their ability to support information transfers from one networked computer to another networked computer. Messages are sent to networked computers through their addresses and thus it is critical that each computer on the network have access to the addresses of the other computers on the network with which it may communicate. The sending computer typically requires other information in addition to the address of the receiving computer such as communication protocols, authorization, time zone and similar information.

To efficiently manage the disparate information required for network communication, network information services have been developed. These services, which include DNS, NIS and NIS+, provide a central database on a server that contains all of the relevant communication information. Networked computers may then access this database as required to obtain the necessary information to send data to a different networked computer. For a complete description of the NIS+ name service, see Rick Ramsey, All About Administering NIS+ (Sunsoft Press 1990).

Security concerns arise because users may access the name service database. In NIS+, security is enforced by determining whether a particular user has the appropriate authorization to perform an operation on the database, which comprises a series of tables. Each table has four categories related to the users that may perform operations on the table: Owner, Group, World and Nobody. In addition, there are four operations that the users within each of these categories may perform: read, modify, create and destroy. When a user requests access to a table, NIS+ determines whether the user is authorized to access the table, which is dependant on the category, Owner, Group, World or Nobody, the user falls into. Next, NIS+ determines whether the operation, read, modify, create or destroy, requested by the user within the previously determined category is authorized to perform. Only authorized operations are then performed.

To determine whether a particular user is authorized to perform a particular operation on a table, NIS+ employs an authentication scheme based on public/private key encryption. When a user first signs onto a system that is a part of a network that is serviced by NIS+, the user must provide a password that is checked against a password stored in an NIS+ table. The password is used to unlock the private key which is stored in the local "key process". There is a key process running on the user's computer and on the NIS+ database server. Each time the user accesses the NIS+ database, there is communication with the local key processes according to the secure-rpc (key verification) procedure to ensure that such access is authorized. Since NIS+ databases are frequently accessed, the communication required by secure-rpc creates substantial system overhead.

In addition to creating overhead, the current NIS+ password scheme is somewhat inefficient. The password that is used to unlock the private key must be entered by a user each time the key process on the user's computer is halted, such as when the client computer is turned off. The password entry procedure to establish the keys is cumbersome and in addition to the inconvenience for the user, this password scheme is difficult to administer which leads to errors and possible security breaches.

The current NIS+ password scheme also is inconvenient when an NIS+ service is added to a previously existing NIS system. The users of the NIS system have login passwords. However, access to the newly installed NIS+ system currently requires an NIS+ password that is distinct from the login passwords. Thus, the system administrator may initially configure each NIS+ password to be identical to each users' password which would involve significant cost and effort. Alternatively, the system administrator may provide each user with a separate NIS+ password to initially access NIS+ which would then allow the user to change the NIS+ password so that it is identical to the login password that they only know. However, in addition to the burden imposed on the user to access NIS+ with a separate password, providing users with separate passwords requires either making the NIS+ password uniform or creating individual passwords and notifying users of these passwords. Creating a uniform NIS+ password compromises security whereas notifying users of individual passwords is time consuming, expensive and not necessarily secure.

There are further difficulties with the present NIS+ password scheme, especially related to password aging. Password aging enhances system security by requiring a user to select a new password at predetermined intervals and preventing password updates before a certain period of time has elapsed. The current NIS+ configuration allows users to access and alter their password aging information. Thus, password aging cannot be controlled by the system, which decreases the level of system security.

As has been described, there are significant problems with the current password scheme in NIS+. First, the NIS+ password scheme is complicated and difficult to administer, which may lead to security breaches and also creates a large amount of system overhead because key verification must occur each time the NIS+ database is accessed. Second, password aging cannot be enforced. The present invention solves these problems without compromising system security by eliminating the requirement of a separate NIS+ password and securely performing password updates through a process that also enforces password aging.

SUMMARY OF THE INVENTION

The present invention provides methods and apparatus for updating passwords in a name service system. A server includes a name service database that further includes a plurality of tables with information, including passwords and communications information, concerning users. According to the present invention, the database may be accessed without key processes, thereby minimizing communications overhead and eliminating the requirement for a separate password for the name service system. However, the present invention also supports access to the database through key processes and, in this case, ensures that the password for the name service system is identical to the user's network password.

To enforce name system security, users are denied direct access to their passwords and password aging information, and they may be updated only through a process running on the NIS+ server. The password update process has write access to the password and aging information in the database. The password update process is invoked when users change their passwords, which occurs when a user logs on and the password aging information indicates that the user should change the current password or the user wishes to change the current password.

To update a password, the user's computer, the client computer, contacts the password update process. The user is then prompted for his or her login password and a Diffie-Hellman key-pair ($P_u$ and $S_u$) is generated for the user based on the current time and password. Next, the server's public key $P_d$ is obtained from a directory object and a common key is generated from $P_d$ and $S_u$ by using the Diffie-Hellman public key encryption scheme.

The client sends by secure RPC the username and the generated public key $P_u$ and the password (encrypted with the common key) of the user whose password is to be updated to the process on the NIS+ master server. The process then determines the NIS+ principal name of the user by examining the username sent from the client. The process then checks the password aging information for the user by accessing the database according to the NIS+ principal name. If the password aging information indicates that an update is proper, the process generates a common DES key ($CK_{ud}$) based on the public key $P_u$ and the secret key $S_d$ of the host principal on which the password update process is running. The process then uses this key to decrypt the password sent from the client and verifies that it matches the password stored in the NIS+ password table for the user whose password is being updated.

If the passwords match, the process sends a variable R encrypted with the common DES key and control passes to the client. The user is then prompted for a new password, which is encrypted with the common DES key $CK_{ud}$ and sent along with R to the password update process. The password update process decrypts the response from the client using $CK_{ud}$ and checks that R matches the one it sent to the client, ensuring that the response came from the client. The password update process encrypts the new password and updates the password entry and the time of the password update. The process also updates the secret key entry if the process had re-encrypted/generated a secret key for the user.

BRIEF DESCRIPTION OF THE DRAWINGS

The objects features and advantages of the present invention will be apparent from the following detailed description of the preferred embodiment of the invention with references to the drawings in which:

FIG. 3 is an illustration of a network information service password update table.

FIG. 4 illustrates the structure of a network information service directory object.

NOTATION AND NOMENCLATURE

Figure 1:
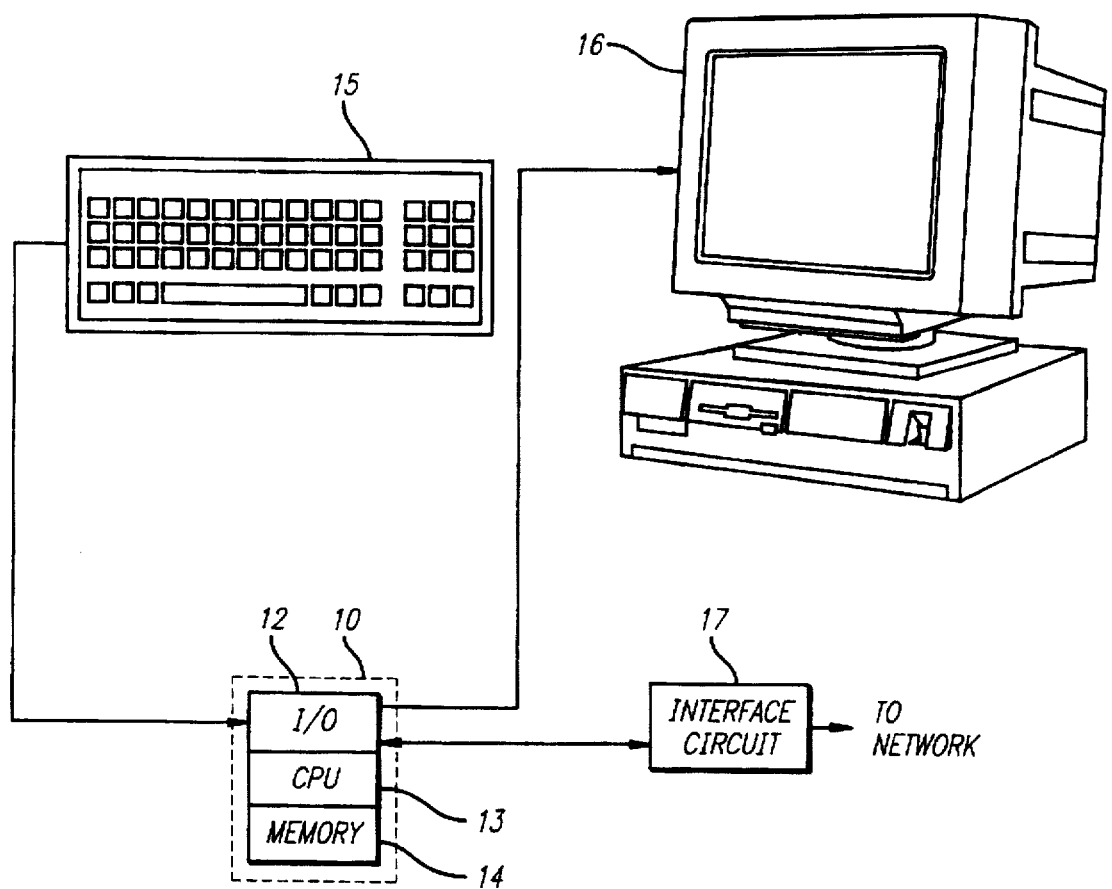
FIG. 1 is a functional block diagram illustrating one possible client computer system incorporating the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below.

DETAILED DESCRIPTION OF THE INVENTION

The present invention discloses apparatus and methods for a password update protocol. In the following description, numerous specific details are set forth such as the type of network information service, NIS+, in order to provide a through understanding of the present invention. However, it will be apparent to one skilled in the art that the present invention may be practiced without these specific details. In other instances, well known circuits, structures and the like are not described in detail so as not to obscure the present invention unnecessarily.

Exemplary Hardware

FIG. 1 illustrates a data processing system in accordance with the teachings of the present invention. Shown is a computer 10, which comprises three major components. The first of these is an input/output (I/O) circuit 12 which is used to communicate information in appropriately structured form to and from other portions of the computer 10. In addition, computer 10 includes a central processing (CPU) 13 coupled to the I/O circuit 12 and a memory 14. These elements are those typically found in most general purpose computers and, in fact, computer 10 is intended to be representative of a broad category of data processing devices. Also shown is an interface circuit 17 coupled to the I/O circuit 12 for coupling the computer 10 to a network, in accordance with the teachings herein. The interface circuit 17 may include encrypting and decrypting circuitry incorporating the present invention, or as will be appreciated, the present invention may be implemented in software executed by computer 10. A raster display monitor 16 is shown coupled to the I/O circuit 12 and issued to display images generated by CPU 13 in accordance with the present invention. Any well known variety of cathode ray tube (CRT) or other type of display may be utilized as display 16.

System Overview

Figure 2:
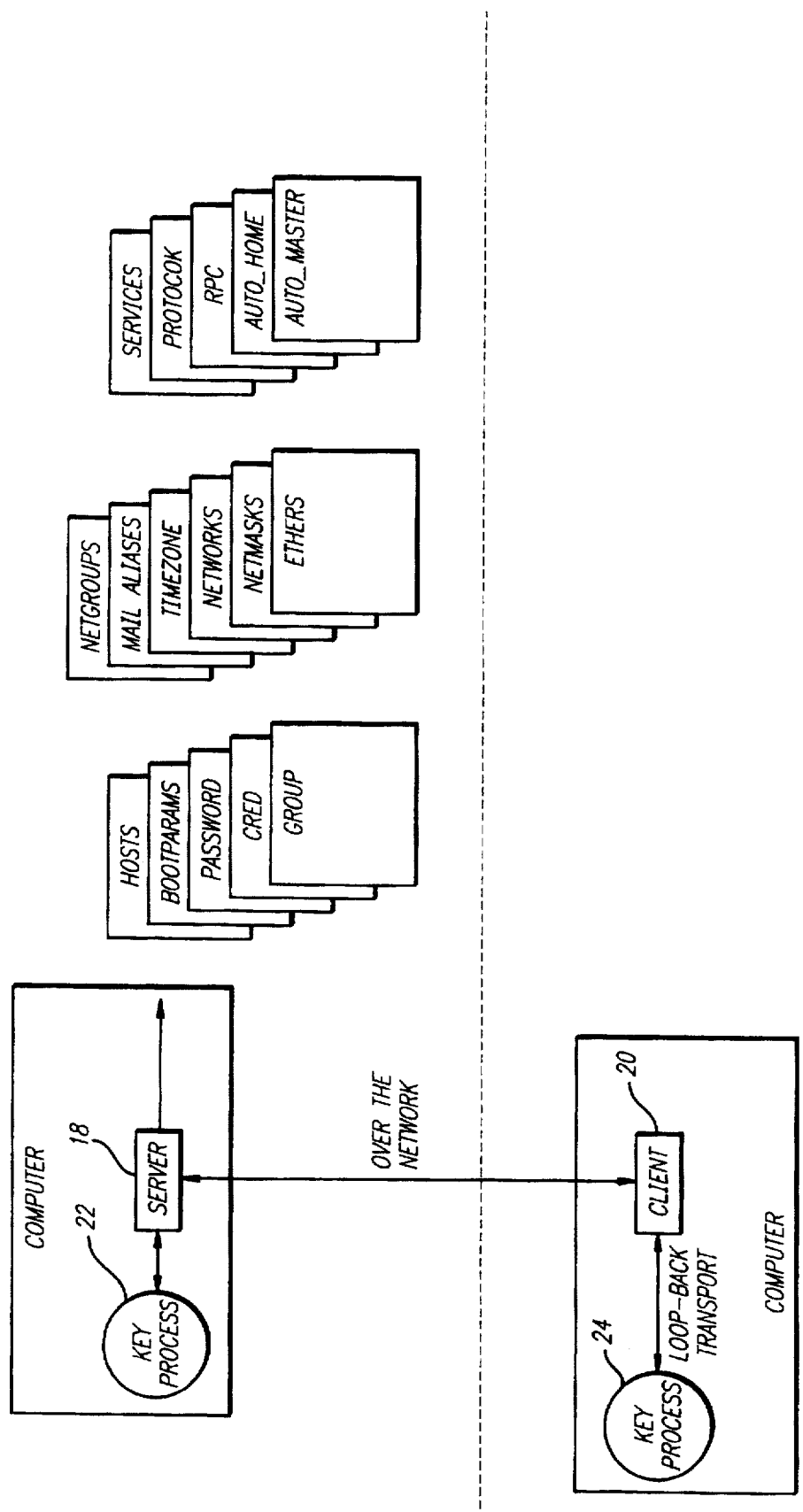
FIG. 2 is a block diagram of a typical client server architecture including a network information service.

FIG. 2 illustrates a client/server architecture that includes a network information service. A server 18 includes a network information service database that further includes a plurality of tables with information, including passwords and communications information, concerning users. A client 20 may access information in the database if the user of the client computer has the appropriate authority. In current NIS+ systems, the client 20 runs a key process 24 and a key process 22 runs on the server 18.

The client 20 communicates with its key process 24 and then sends relevant verification information to the server 18, which communicates with its key process 22. The server 18 then checks whether the user is authentic.

The Password Update Process

In NIS+, passwords are stored in a password table as illustrated in FIG. 3. The table includes a user name column 50, a password column 52, a user identification column 56, and a shadow column 58 that includes password aging information. The shadow column indicates the last time the password was changed (lastchg) 60, the minimum and maximum number of days between password changes (min 62 and max 64) and other information. Since a user must be able to have write access to the lastchg 60 information to update when a password was changed, the user has write access to the entire shadow column 58 which allows users to change min 62 and max 64 and thus circumvent password aging mechanisms.

According to the present invention, access to the lastchg column 60 is denied to users and granted solely to a password update process. The password update process runs on the server 18 and performs password updates according to the password aging information. The password process has write access to the password 52 and shadow 58 columns in the database and users do not directly have such access. The password update process also ensures that password updates are secure even though there is no credential (keys) for the user.

The password update process is invoked when users change their passwords, which occurs when a user logs on and the password aging information indicates that the user must change the current password or the user desires to change the current password. The flow chart of FIGS. 5a–5g illustrate the operation of the password update process. At block 63 of FIG. 5a, the user's computer, the client computer 20, locates the password update process. An NIS+ directory object is used to determine the address of the master server of the domain in which the update will occur. The directory object structure is illustrated in FIG. 4.

Figure 5A:
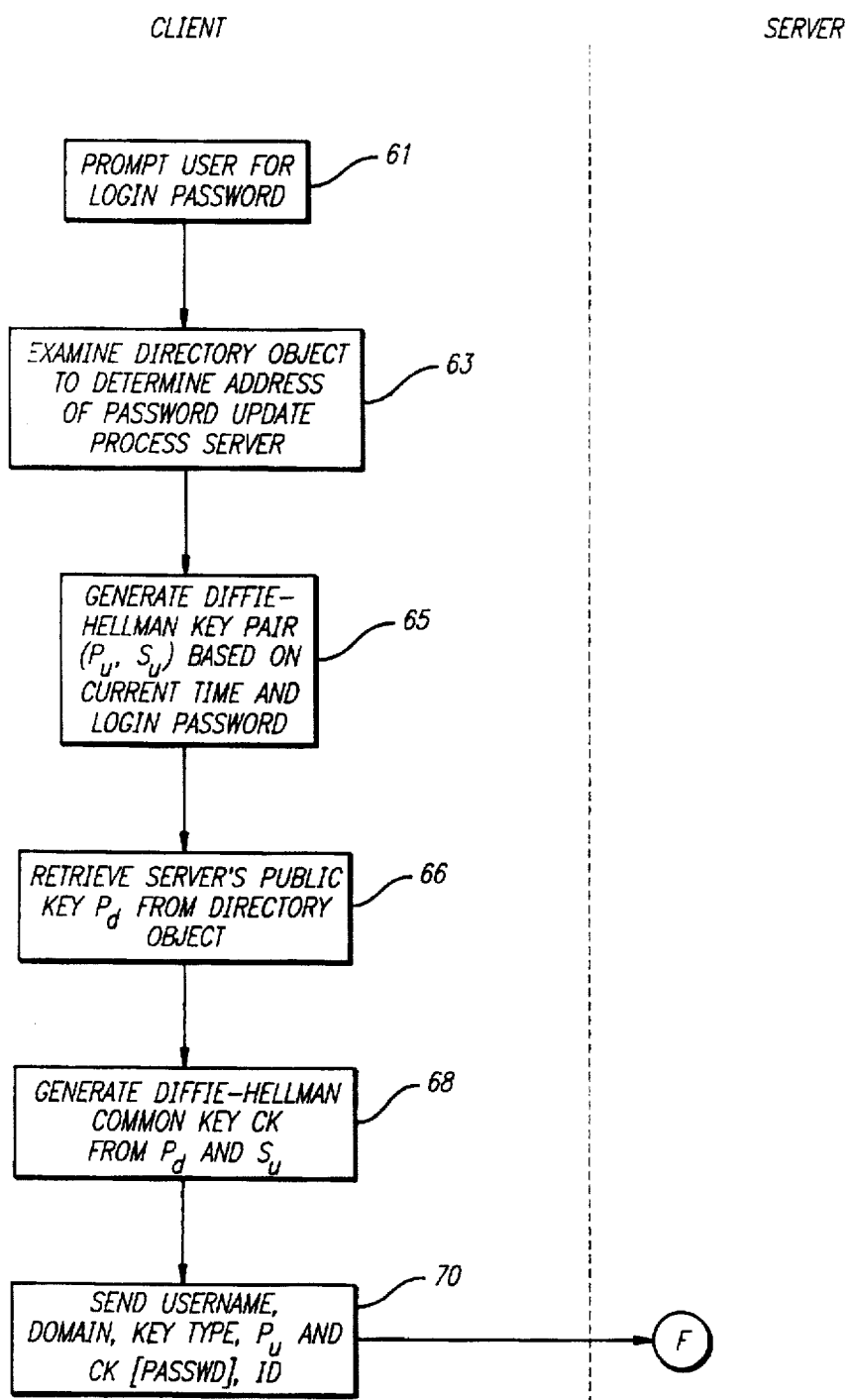
FIGS. 5a–5g are a flow chart of the password update process of the present invention.
Figure 5B:
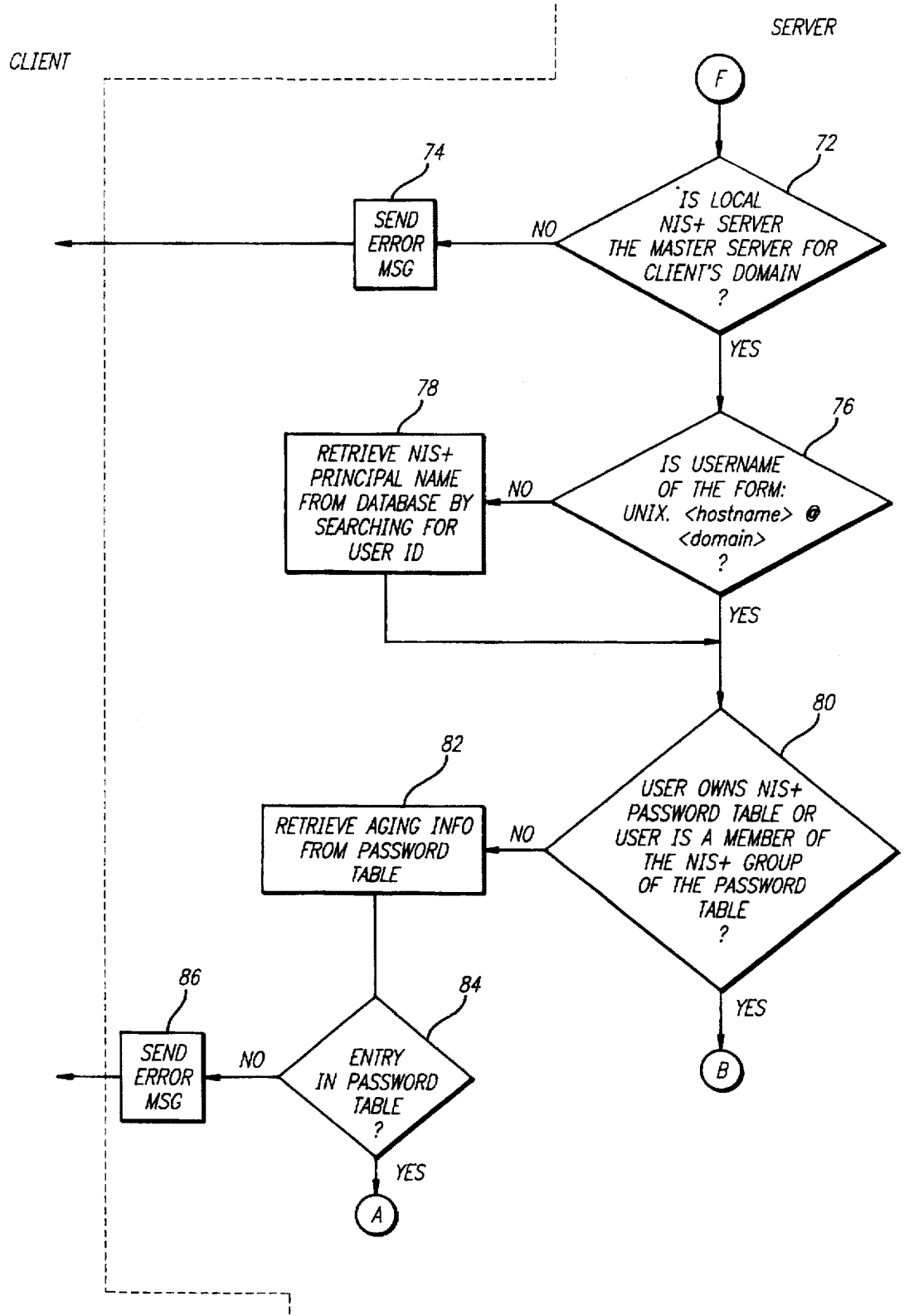
Figure 5C:
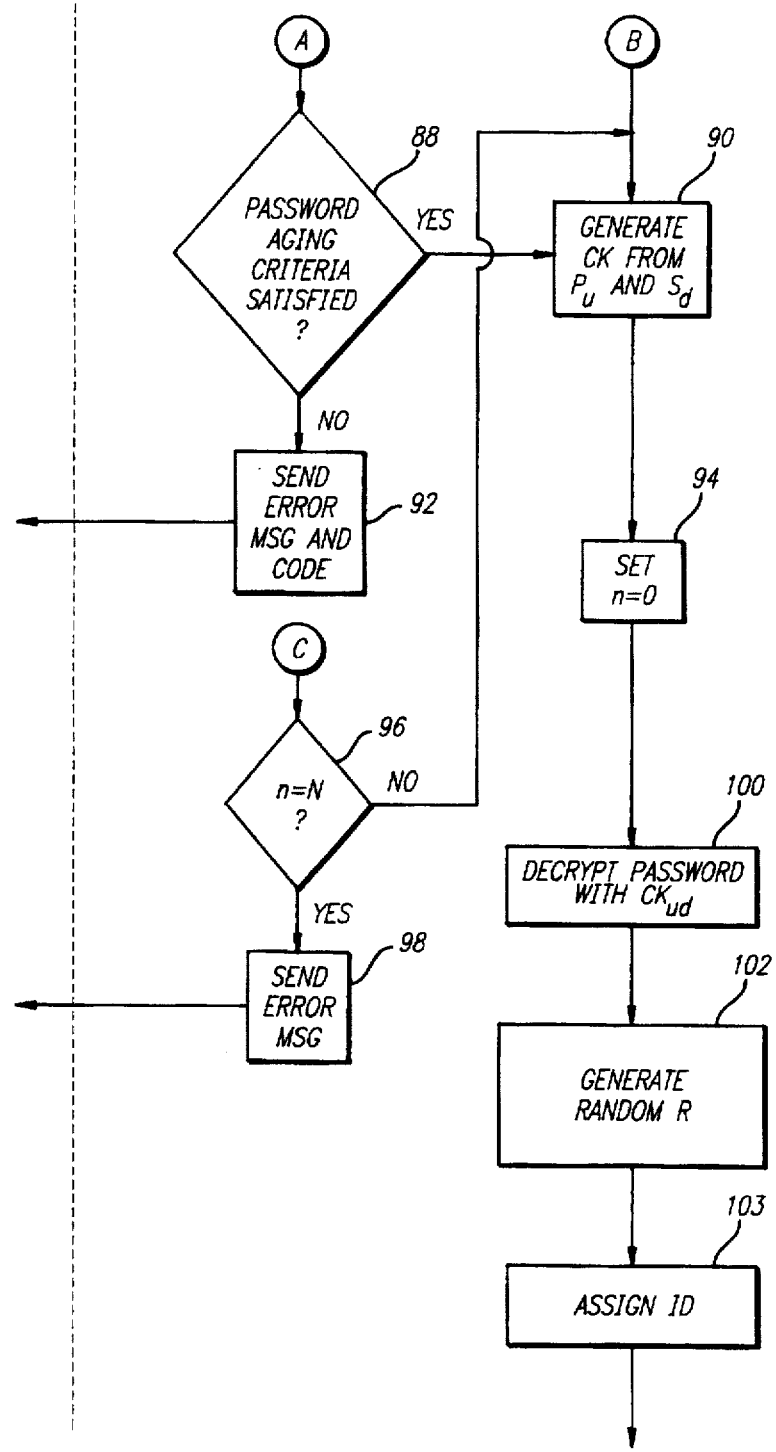

At block 61 of FIG. 5a, the user is prompted for his or her current login password. Control is passed to block 65, where the routine generates a Diffie-Hellman key-pair ($P_u$ and $S_u$) for the user based on the current time and password. Next, as shown at block 66, the server's public key $P_d$ is obtained from the directory object illustrated in FIG. 4. At block 68 of FIG. 5a, a common key CK is generated from $P_d$ and $S_u$ by using the Diffie-Hellman public key encryption scheme. It will be appreciated that only the client and the server can generate the common key since such generation requires either the client's secret key or the server's secret key which they only possess.

At block 70, the client sends by secure RPC the username of the user whose password is to be updated. For a description of secure RPC, see R. Srinivasan, "RPC: Remote Procedure Call Protocol Specification Version 2," Nov. 30, 1994, submitted as a Request for Comments document for the Internet Architecture Board. The client also sends by secure RPC the domain name, the key type, which in a preferred embodiment is Diffie-Hellman, the password encrypted with the common key CK, and an identifier ID which is set to 0. As shown at block 72 of FIG. 5b, the process first determines whether the local NIS+ server is the master server for the domain sent by the client. If the process determines that the local NIS+ server is not the master server for the client's domain, then it will return a failure signal, as shown at block 74.

If the local NIS+ server is the master server, the process branches to block 76 where it determines the NIS+ principal name of the user by examining the username sent from the client. The NIS+ principal name is the name used by NIS+ to retrieve information stored in the NIS+ database and this name is distinct from the "username" sent by the user. An NIS+ principal name has the form:

<username/hostname>.<domain>.

A "username" can have one of two forms:

unix.<hostname>@<domain> or unix.<user_id>@<domain>.

At block 76, the process determines whether the username is of the hostname type. For the hostname case, usernames are converted to NIS+ principal names by simply extracting the hostname and domain from the username and adding the periods as shown above. For the user_id case, the routine determines the NIS+ principal associated with user_id by retrieving this information from the NIS+ database, as shown at block 78.

The actual user may be different than the user whose password is being updated such as when a system administrator updates a user's password. At block 80, the routine determines if the actual user is a NIS+ administrator by checking if the actual user owns the NIS+ password table or by checking if the actual user is a member of the NIS+ group of the password table (or performing both checks). As shown at block 90 of FIG. 5c, if the routine determines that the actual user is an NIS+ administrator, then the password aging information is not checked for the user whose password is to be changed. Otherwise, the process attempts to retrieve the aging information from the column of the NIS+ password table for the user whose password is to be updated, as shown at block 82 of FIG. 5b. If no entry exists for the user, the process branches to block 86 and returns a failure signal with an error code. Otherwise, at block 88 of FIG. 5c, the process checks whether a sufficient number of days have passed since the last update to satisfy the minimum number of days between password updates which is stored in the table illustrated in FIG. 3. If the proper minimum number of days have not passed, the process returns a failure signal with an appropriate error code, as shown at block 92.

If the aging criteria are satisfied, as shown at block 90, the process generates a common DES key ($CK_{ud}$) based on the public key $P_u$ and the secret key $S_d$ of the host principal on which the password update process is running. At block 94, the process sets a variable n to 0. The routine advances to block 100 and uses the key $CK_{ud}$ to decrypt the password sent from the client and at block 102 generates a random number R based on the current time and at block 103 assigns a unique value to ID. At block 104 of FIG. 5d, the process verifies that the password matches the password stored in the NIS+ password table for the user whose password is being updated. If the verification fails, the process branches to block 108, makes an appropriate log entry at block 110 and sends R and ID encrypted with $CK_{ud}$.

If the verification succeeds, the process branches to block 106 and returns a success message along with R and ID encrypted with $CK_{ud}$.

At block 116, the client determines whether a success message was received. If so, the process branches to block 122 to construct a new password. Otherwise, the user is again prompted for the current password at block 118. The encrypted password and ID are sent to the server at block 120 which branches from block 114 to block 96 of FIG. 5c. The process allows the client a maximum of "N" (configurable) attempts to send across a valid password and on the $N^{th}$ failed attempt it returns an appropriate signal and error code and the client will exit with an appropriate message as shown at block 98. To prevent misuse of this protocol, the process will cache failed attempts for a period of time (the default is 30 minutes) during which if it receives further requests for the same user and the password sent is still invalid then the process will not respond to the user. The default time period for caching failed attempts can be altered.

Figure 5D:
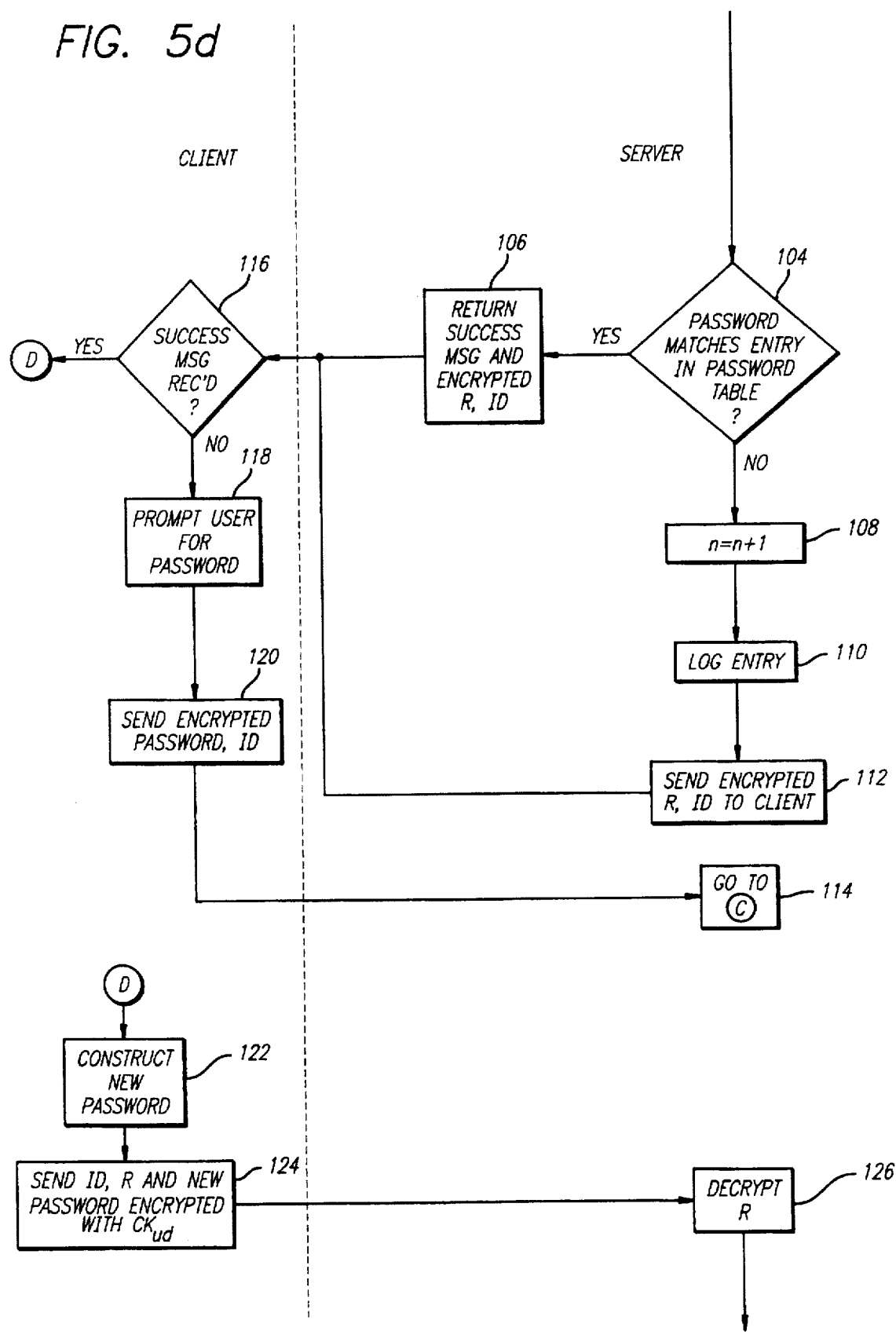

As previously described, once a valid password is provided by the user, at block 106 of FIG. 5d, the process returns to the client an appropriate message, the random value R and the identifier ID, both encrypted with the common DES key $CK_{ud}$. At block 122 of FIG. 5d, the client constructs a new password following the same rules as in passwd(1). For a description of passwd(1), see Rick Ramsey, All About Administering NIS+ (Sunsoft Press 1990). At block 124, the client sends the identifier ID, and the random value R together with the new password, encrypted with the common DES key $CK_{ud}$. Any other changed password information is also sent to the process.

Figure 5E:
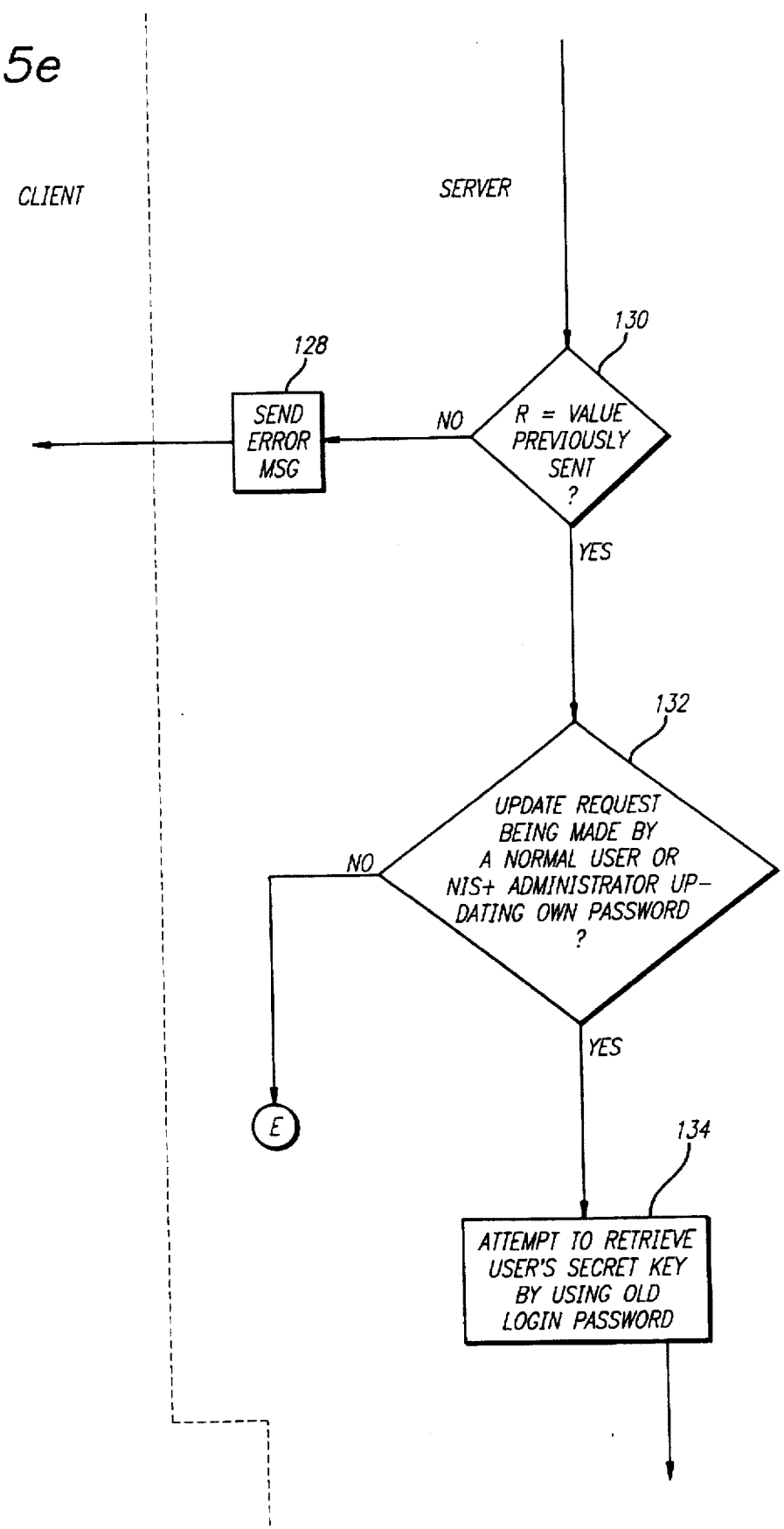
Figure 5F:
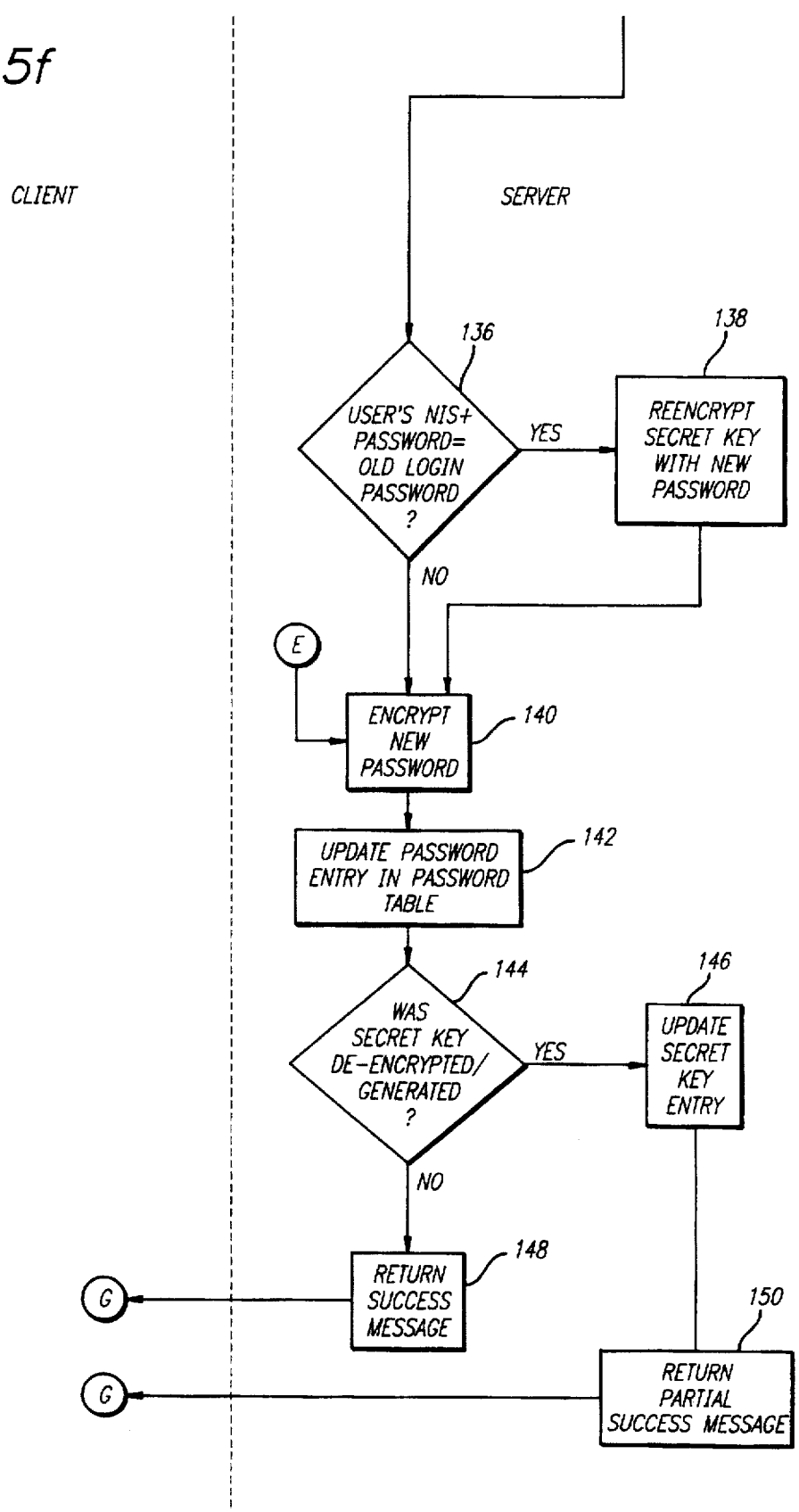
Figure 5G:
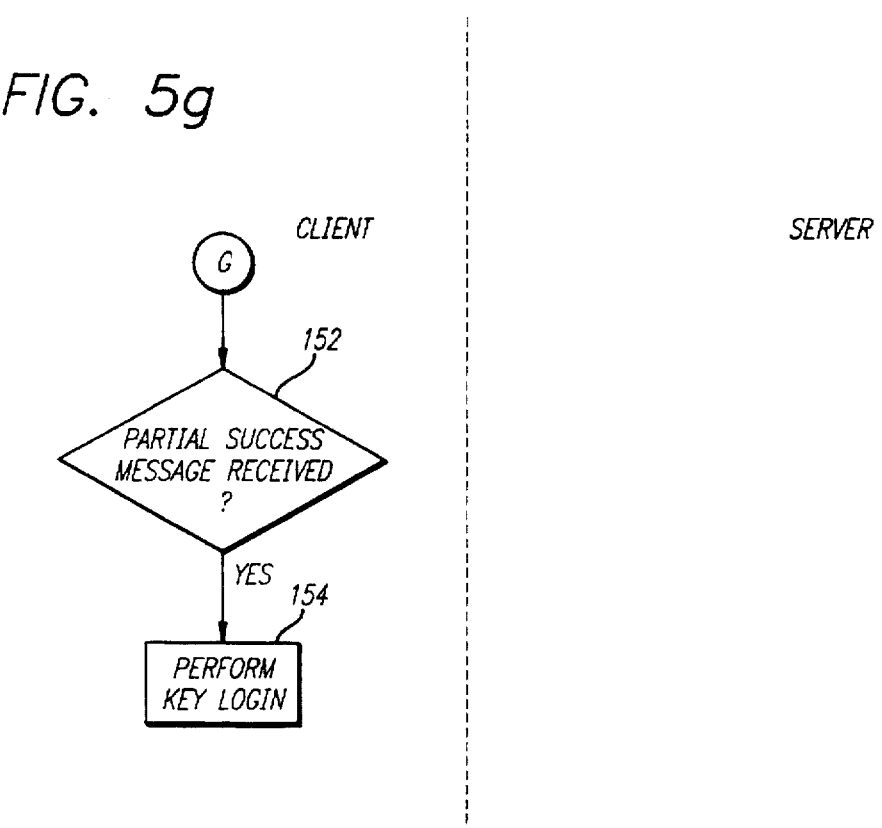

At block 126, the password update process decrypts the response from the client using $CK_{ud}$ and at block 130 of FIG. 5e checks that R matches the one it sent to the client, ensuring that the response came from the client and that it is not a replay. If the password update request is being made by a normal user or if a NIS+ administrator was updating his or her own password, then the process branches from block 132 to block 134 and attempts to retrieve the user's secret key by using the user's old login password, as shown at block 134 and as will be described more fully below. Otherwise, block 132 branches to block 140 of FIG. 5f. If the process cannot retrieve the user's secret key because the separate NIS+ password differs from the user's old login password, the process branches from block 136 of FIG. 5f to block 138.

Otherwise, if the user does not have a separate NIS+ password or the system successfully retrieves the secret key, the process branches from block 136 to block 140. At block 140, the password update process encrypts the new password and updates the password entry and the time of the password update at block 142. At block 144, the process checks whether a secret key was re-encrypted/generated. The process updates the secret key entry at block 146 if the process had re-encrypted/generated a secret key. If the process had not generated a new secret key, it branches to block 148 and returns an appropriate success message. Otherwise, the process returns either a partial success message at block 150 and a "field/error_code" list in the case when the client requested to update a number of fields but the process could only successfully change a few, or if it had to generate a new key-pair, or if it could not update the NIS+ cred table, or a total failure occurred.

If the user has a Secure-RPC credential, then he or she has to run a command called 'keylogin' on the client 20 to establish their clear (unencrypted) secret/private key with the key process 24. If the password used to encrypt the private key matches the login password, then this is performed automatically.

When the key-pair is updated by the password update process, the password update process will send back a partial success message to the client 20 indicating that it had generated new key-pair for the user. Normally, the user would then have to run the 'keylogin' command to establish the new private key with the key process 24. According to the present invention, the user need not perform a 'keylogin' and the client 20 will automatically establish the new private key with the key process 24. Thus, as shown at blocks 152 and 154 of FIG. 5g, if the user is changing his or her own password, the client 20 will perform a "keylogin" for the user if it received a partial success message with the field set to "NPD_SECRETKEY" and the error code set to "NPD_KEYSUPDATED". In the case where an administrator was updating someone else's password, the administrator should notify that person not only of the password change but also of the key-pair change, if one occurred.

As previously described, for users that must access the NIS+ database through the use of Secure-RPC, the password update process may not be able to recover the user's secret key if the password used to encrypt it differs from the user's old login password. In this case, for case of use, the password update process ensures that the new login password is identical to the NIS+ password.

Figure 6:
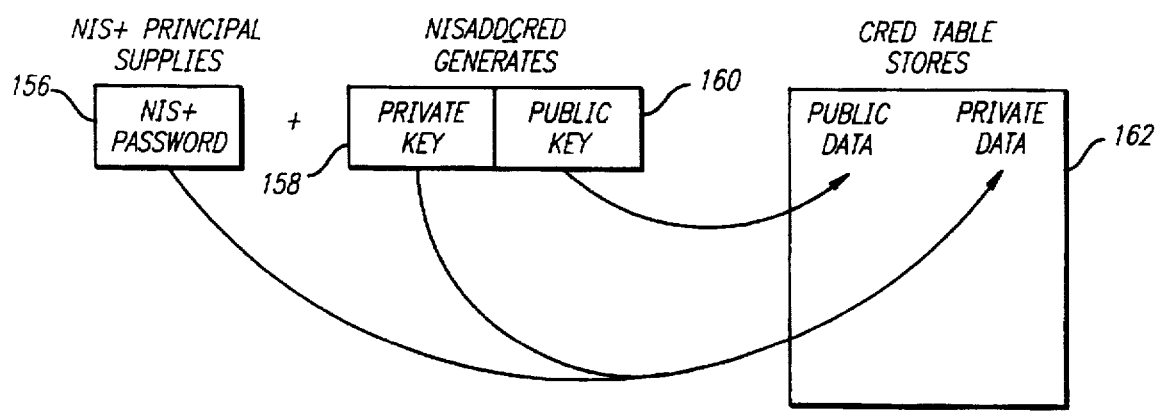
FIG. 6 is a block diagram of the encryption mechanisms for a network information service.

FIG. 6 is an overview of the prior art generation of a key from an NIS+ password. A pair of random numbers are generated according to the Diffie Hellman scheme. These numbers, a public key 160 and a private key 158, are stored in a table known as the Cred table 162. Before the private key 158 is stored in the Cred table, it is encrypted with the user's NIS+ password 156. For a description of how the NIS+ database is accessed, see "All About Administering NIS+" at pp. 74–76. To ensure that the NIS+ password is equivalent to the new login password, the process either generates new public and private keys for the user and then encrypts the generated private key with the new login password, as illustrated at block 138 of FIG. 5f, or it decrypts the private key with the old login password successfully and re-encrypts the private key with the new login password. Similarly, if the password update request is being made by an NIS+ administrator for another user and the user has a separate NIS+ password, then because the process does not have access to the password used to encrypt the user's private key, at block 138 the process generates a new key-pair and encrypts the private key with the new login password. In this manner, those users that are required to communicate with NIS+ through use of Secure-RPC have an NIS+ password that is identical to the new login password.

Although the present invention has been described in terms of a preferred embodiment and with reference to FIGS. 1–6, it will be appreciated that various modifications and alterations might be made by those skilled in the art without departing from the spirit and scope of the invention. The invention should therefore be measured in terms of the claims which follow.

I claim:

1. A method for updating a password in a name service system, said name service system comprising a database stored on a server, said database comprising a password table containing a password for each user name in a plurality of user names, said method comprising the steps of:
   sending by a sender a user name in said plurality of user names to a password update process running on said server, said sender being under the control of a user;
   determining whether said sender has authority to update said user name's password;
   determining by said password update process whether password aging criteria for said user name are met;
   if said sender has authority to update said user name's password and said password aging criteria are met, performing the steps of:
   prompting said user for a new password;
   encrypting said new password;
   sending said encrypted new password to said password update process;
   decrypting said encrypted new password; and
   storing said new password in said password table.

2. The method of claim 1 wherein said password table is stored in an NIS+ database.

3. The method of claim 1 wherein said step of determining whether said sender has authority to update said user name's password comprises the steps of:
   prompting said user for a login password;
   encrypting said login password;
   sending said encrypted login password to said password update process running on said server;
   decrypting by said password update process said encrypted login password; and comparing by said password update process said decrypted login password with a password for said user name stored in said password table.

4. The method of claim 3 wherein:
   said step of encrypting said login password comprises the steps of:
   generating a Diffie-Hellman key pair ($P_u$, $S_u$) for said sender based on the current time and said login password;
   obtaining said server's public key ($P_d$);
   generating a common key ($CK_{ud}$) from said server's public key and said sender's private key ($S_u$); and
   encrypting said login password with $CK_{ud}$; and
   said step of decrypting by said password update process said encrypted login password comprises the steps of:
   generating $CK_{ud}$ from said sender's public key ($P_u$) and said server's private key ($S_d$); and
   decrypting said encrypted login password with $CK_{ud}$.

5. The method of claim 4, where said database further comprises name information service private keys and name information service passwords for at least some user names in said plurality of user names, further comprising the steps, performed after said step of sending said encrypted new password to said password update process, of:
   attempting by said password update process to retrieve a name information service private key for said user name stored in said database based upon said login password;
   if said name information service private key exists and said user name's name information service password does not equal said login password, performing the steps of:
   generating a new name information service public and private keys;
   encrypting said new name information service private key with said new password; and
   storing said encrypted new name information service private key in said database,
   thereby ensuring that a name information service password identical to said new password is stored in said database for said user name.

6. The method of claim 3 further comprising the steps of:
   initializing an identification variable n to 0;
   if said decrypted login password does not match said password for said user name stored in said password table, performing the steps of:
   incrementing n; and
   if n is equal to a predetermined maximum value N, preventing said user from further attempting to update a password in said database.

7. The method of claim 1, further comprising the steps, performed if said sender has authority to update said user name's password and said password aging criteria are met, of:
   generating by said password update process a random number R; and
   sending R to said sender;
   where in said step of encrypting said new password said new password is encrypted together with R;
   where in said step of sending said encrypted new password said new password encrypted together with R is sent; and
   where said password update process performs said step of storing said new password only if the value of R encrypted together with said new password matches the value as first generated.

8. The method of claim 1 wherein said step of encrypting said new password further includes the step of encrypting said new password according to a data encryption standard (DES) algorithm.

9. The method of claim 1 wherein password aging criteria are stored in said password table.

10. The method of claim 9 wherein said password table comprises a plurality of columns and said password aging criteria are stored in one column of said plurality of columns.

11. A network including a client and a server for updating passwords in a name service system, said name service system comprising a database stored on a server, said database comprising a password table containing a password for each user name in a plurality of user names, said network comprising:
   a transmission device included in said client that sends a user name in said plurality of user names to a password update process running on said server, said client being under the control of a user;
   a computing device included in said server that determines whether said client has authority to update said user name's password;
   a computing device included in said server that determines whether password aging criteria for said user name are met;
   a prompting device included in said client that prompts said user for a new password if said sender has authority to update said user name's password and said aging criteria are met;
   an encrypting device included in said client that encrypts said new password;

wherein said transmission device sends said encrypted new password to said password update process;

a decrypting device included in said server that decrypts said encrypted new password; and a storage device included in said server that stores said new password in a password table.

12. The network of claim 11 wherein said password able is stored in an NIS+ database.

13. The network of claim 11 wherein said computing device for determining whether said client has authority to update said user name's password comprises:

a decrypting device that decrypts an encrypted login password; and a comparator that compares said decrypted login password with a password for said user name stored in said password table.

14. The network of claim 13 wherein:

said encrypting device included in said client further comprises:
- a Diffie-Hellman key pair generator;
- a common key generator that generates a common key ($CK_{ud}$) based upon said server's public key ($P_d$) and said client's private key ($S_u$);
- a password encrypting device that encrypts said login password with $CK_{ud}$;

said decrypting device included in said server further comprises:
- a common key generator that generates $CK_{ud}$ from said client's public key ($P_u$) and said server's secret key ($S_d$); and
- a password decryption device that decrypts said encrypted login password with $CK_{ud}$.

15. The network of claim 14 wherein:

said server further comprises an initializing device that initializes an attempt variable n to 0;

said server further comprises an incrementer that increments n if said decrypted login password does not match said password for said user name stored in said password table;

said server further comprises logic that transmits an error message to said client when n equals a predetermined maximum value N; and said client further comprises logic that prevents said user from attempting to update a password in said database when said error message is received.

16. The network of claim 11 wherein:

said server further comprises a pseudo-random number generator that generates a random number R;

said server further comprises a device that transmits R to said client;

and wherein:

said encrypting device included in said client encrypts said new password together with R;

said transmission device included in said client sends said new password encrypted together with R to said password update process;

said decrypting device included in said server decrypts said encrypted new password and R, producing a decrypted R;

said storage device included in said server stores said new password for said user name only if said decrypted R is identical to said random number R previously generated by said pseudo-random number generator.

17. The network of claim 11 wherein said client encryption device comprises a data encryption standard (DES) encryption device.

18. The network of claim 11 wherein password aging criteria are stored in said password table.

19. The network of claim 18 wherein said password table comprises a plurality of columns and said password aging criteria are stored in one column of said plurality of columns.

20. A computer program product comprising:

a computer usable medium having computer readable code embodied therein for updating a password in a name service system comprising a database stored on a server, said database comprising a password table containing a password for each user name in a plurality of user names, said computer readable code comprising:

a first computer readable program code device that sends from a client a user name in said plurality of user names to a password update process running on said server, said client being under the control of a user;

a second computer readable program code device that determines whether said client has authority to update said user name's password;

a third computer readable program code device that determines by said password update process whether password aging criteria for said user name are met;

a fourth computer readable program code device that prompts said user for a new password if said client has authority to update said user name's password and said aging criteria are met;

a fifth computer readable program code device that encrypts said new password;

a sixth computer readable program code device that sends said encrypted new password to said password update process; and a seventh computer readable program code device that decrypts said encrypted new password and store said new password in said password table.

21. The computer program product of claim 20 wherein said seventh computer readable program code device stores said new password in an NIS+ database which contains said password table.

22. The computer program product of claim 20 wherein said second computer readable program code device comprises a computer readable program code device that:

prompts said user for a login password;

encrypts said login password; and sends said encrypted login password to said password update process running on said server.

23. A method for updating a password in a name service system, said name service system comprising a database stored on a server, said database comprising a password table containing a password for each user name in a plurality of user names, said method comprising the steps of:

receiving a user name in said plurality of user names and information identifying a sender;

determining whether said sender has authority to update said user name's password;

determining whether password aging criteria for said user name are met;

if said sender has authority to update said user name's password and said password aging criteria are met, performing the steps of:
sending said sender a success message;
receiving an encrypted new password from said sender;
decrypting said encrypted new password; and
storing said new password in said password table.

24. A method for updating a password in a name service system, said name service system comprising a database stored on a server, said database comprising a password table containing a password for each user name in a plurality of user names, said method comprising the steps of:
sending by a sender a user name in said plurality of user names to a password update process running on said server, said sender being under the control of a user;

receiving by said sender from said password update process running on said server an indication of whether said sender has authority to update said user name's password and whether password aging criteria are met for said user name;

if said sender has authority to update said user name's password and said password aging criteria are met, performing by said sender the steps of:
prompting said user for a new password;
encrypting said new password; and
sending said encrypted new password to said password update process.

* * * * *